(12) United States Patent
Robbins et al.

(10) Patent No.: US 8,424,832 B2
(45) Date of Patent: Apr. 23, 2013

(54) METHOD AND APPARATUS FOR AN ADAPTIVE SUSPENSION SUPPORT SYSTEM

(75) Inventors: Jody G. Robbins, Phoenix, AZ (US); William E. Woodbury, II, Apache Junction, AZ (US); Scott A. Boster, Scottsdale, AZ (US); Mark J. Miskill, Phoenix, AZ (US)

(73) Assignee: Elliptical Mobile Solutions, LLC, Chandler, AZ (US)

( * ) Notice: Subject to any disclaimer, the term of this patent is extended or adjusted under 35 U.S.C. 154(b) by 898 days.

(21) Appl. No.: 11/609,833

(22) Filed: Dec. 12, 2006

(65) Prior Publication Data

US 2007/0235911 A1 Oct. 11, 2007

Related U.S. Application Data

(63) Continuation-in-part of application No. 11/278,642, filed on Apr. 4, 2006.

(51) Int. Cl.
*F16M 13/00* (2006.01)
*F16M 11/00* (2006.01)
*B60N 2/02* (2006.01)

(52) U.S. Cl.
USPC ...... 248/550; 248/562; 248/636; 267/140.11; 267/136; 180/167; 180/271; 296/65.01

(58) Field of Classification Search .................. 248/550, 248/559, 562, 566, 618, 638, 636; 267/131, 267/136, 64.24, 140.11, 140.14, 140.15; 296/63, 190.7, 65.01, 65.02; 297/303.4; 188/267, 267.1, 267.2, 378, 379, 266.1; 180/167, 180/271, 272, 273; 280/734, 735; 318/466, 318/467; 701/37, 49

See application file for complete search history.

(56) References Cited

U.S. PATENT DOCUMENTS

| | | | |
|---|---|---|---|
| 2,778,704 A | 1/1957 | Joachim | |
| 3,038,739 A | 6/1962 | Vogel | |
| 3,181,878 A | 5/1965 | Vogel | |
| 3,192,306 A | 6/1965 | Skonnord | |
| 3,275,277 A * | 9/1966 | Illar et al. | 248/566 |
| 3,558,154 A | 1/1971 | Jackson | |
| 3,563,627 A | 2/1971 | Whipps | |
| 3,725,746 A | 4/1973 | Carroll | |
| 3,797,691 A | 3/1974 | Williams, Jr. | |
| 4,167,983 A | 9/1979 | Seider et al. | |
| 4,351,515 A | 9/1982 | Yoshida | |

(Continued)

FOREIGN PATENT DOCUMENTS

EP 0393655 10/1990

OTHER PUBLICATIONS

USPTO communication dated Apr. 21, 2008 concerning co-pending U.S. Appl. No. 11/317,414, filed Dec. 22, 2005 by Jodi G. Robbins.

(Continued)

*Primary Examiner* — Tan Le (57) ABSTRACT

A method and apparatus for an adaptive, multi-axis suspension support system providing both coarse and fine suspension to a payload. Coarse suspension control is provided to maintain the payload within a coarse range of position. Fine suspension control is provided by monitoring and analyzing vibration characteristics in both time and frequency domains to determine the required amount of damper resistance to be exerted by a magnetorheological (MR) device.

8 Claims, 4 Drawing Sheets

U.S. PATENT DOCUMENTS

| | | | | |
|---|---|---|---|---|
| 5,822,707 A * | 10/1998 | Breed et al. | | 296/65.08 |
| 5,829,767 A | 11/1998 | Grossman | | |
| 5,851,143 A | 12/1998 | Hamid | | |
| 5,918,551 A | 7/1999 | Liu | | |
| 5,975,508 A * | 11/1999 | Beard | | 248/550 |
| 6,034,355 A | 3/2000 | Naderi et al. | | |
| 6,082,715 A | 7/2000 | Vandermolen | | |
| 6,086,060 A | 7/2000 | Berthold | | |
| 6,129,434 A | 10/2000 | Melane et al. | | |
| 6,170,622 B1 | 1/2001 | Wakui et al. | | |
| 6,179,398 B1 | 1/2001 | Martin | | |
| 6,238,029 B1 | 5/2001 | Marzec et al. | | |
| 6,412,759 B1 | 7/2002 | Krauss | | |
| 6,443,542 B1 | 9/2002 | Lindquist et al. | | |
| 6,719,258 B2 | 4/2004 | Bryngelson et al. | | |
| 6,752,250 B2 * | 6/2004 | Tanner | | 267/136 |
| 6,907,969 B2 | 6/2005 | Ichikawa et al. | | |
| 7,038,126 B2 | 5/2006 | Solet | | |
| 7,055,833 B2 | 6/2006 | Wixted et al. | | |
| 7,144,320 B2 | 12/2006 | Turek et al. | | |
| 7,180,738 B2 | 2/2007 | Mandel et al. | | |
| 7,880,084 B2 | 2/2011 | Adducci et al. | | |
| 7,903,402 B2 | 3/2011 | Tomioka et al. | | |
| 7,957,139 B2 | 6/2011 | Davis et al. | | |
| 2002/0027332 A1 | 3/2002 | Behr | | |
| 2004/0130442 A1 * | 7/2004 | Breed et al. | | 340/443 |
| 2006/0226289 A1 * | 10/2006 | Robbins et al. | | 244/122 R |
| 2007/0278057 A1 * | 12/2007 | Wereley et al. | | 188/267.1 |
| 2007/0278723 A1 * | 12/2007 | Shoemaker et al. | | 267/131 |
| 2008/0007911 A1 | 1/2008 | Hallin et al. | | |
| 2008/0015753 A1 * | 1/2008 | Wereley et al. | | 188/267.1 |
| 2008/0068791 A1 | 3/2008 | Ebermann | | |
| 2008/0156602 A1 * | 7/2008 | Hiemenz et al. | | 188/267.1 |
| 2009/0061755 A1 | 3/2009 | Calder et al. | | |

OTHER PUBLICATIONS

USPTO, Notice of Allowance, U.S. Appl. No. 11/317,414, Sep. 25, 2008, 7 pages.
USPTO, Notice of Allowance, U.S. Appl. No. 11/321,970, Jul. 10, 2009, 6 pages.
USPTO, Office Action, U.S. Appl. No. 11/321,944, Jan. 12, 2009, 9 pages.
USPTO, Notice of Allowance, U.S. Appl. No. 11/608,386, Jul. 27, 2009, 7 pages.
USPTO, Notice of Allowance, U.S. Appl. No. 11/608,561, Mar. 12, 2009, 7 pages.
USPTO, Notice of Allowance, U.S. Appl. No. 11/608,708, Feb. 16, 2010, 6 pages.
USPTO, Office Action, U.S. Appl. No. 12/564,875, Aug. 8, 2012, 6 pages.
USPTO, Office Action, U.S. Appl. No. 12/564,875, Nov. 10, 2011, 5 pages.
USPTO, Office Action, U.S. Appl. No. 12/620,510, Aug. 2, 2012, 6 pages.
USPTO, Office Action, U.S. Appl. No. 12/620,510, Jan. 11, 2012, 9 pages.
Canadian IPO, Office Action, 2,633,893, May 18, 2010, 3 pages.
Canadian IPO, Office Action, 2,633,892, Mar. 5, 2010, 2 pages.
Canadian IPO, Office Action, 2,633,946, Jan. 31, 2011, 2 pages.
Canadian IPO, Office Action, 2,633,891, May 18, 2010, 2 pages.
Canadian IPO, Office Action, 2,633,891, Mar. 28, 2011, 2 pages.
Chinese IPO, Office Action, 200680051278.5, Feb. 9, 2011, 3 pages.
Chinese IPO, Office Action, 200680048216.9, Aug. 21, 2009, 4 pages.
Chinese IPO, Office Action, 200680049762.4, Jul. 1, 2010, 5 pages.
Chinese IPO, Office Action, 200680051278.5, Mar. 1, 2010, 4 pages.
Chinese IPO, Office Action, 200680049692.2, May 9, 2011, 8 pages.
Chinese IPO, Office Action, 200680049692.2, Mar. 19, 2010, 7 pages.
Chinese IPO, Office Action, 200680049762.4, Jun. 14, 2012, 3 pages.
Chinese IPO, Office Action, 200680049762.4, Dec. 22, 2011, 10 pages.
Korean IPO, Office Action, 10-2008-7017873, Jun. 30, 2010, 3 pages.
Korean IPO, Office Action, 10-2008-7017873, Dec. 30, 2010, 3 pages.
Korean IPO, Office Action, 10-2008-7017873, Sep. 30, 2011, 3 pages.
Korean IPO, Office Action, 10-2008-7017874, Jul. 28, 2010, 5 pages.
Korean IPO, Final Office Action, 10-2008-7017874, Jan. 24, 2011, 3 pages.
European IPO, Office Action, 06846613.5, Jun. 6, 2011, 7 pages.
European IPO, Office Action, 06846613.5, Oct. 30, 2012, 3 pages.
European IPO, Office Action, 06848446.8, May 25, 2011, 8 pages.
European IPO, Office Action, 06848446.8, Oct. 19, 2012, 4 pages.
USPTO, Office Action, U.S. Appl. No. 12/620,510, Oct. 23, 2012, 8 pages.
Chinese IPO, Office Action, 200680049762.4, Sep. 26, 2012, 3 pages.

* cited by examiner

METHOD AND APPARATUS FOR AN ADAPTIVE SUSPENSION SUPPORT SYSTEM

This application is a continuation-in-part of application Ser. No. 11/278,642, filed Apr. 4, 2006, the content of which is incorporated herein by reference in its entirety.

FIELD OF THE INVENTION

The present invention generally relates to suspension support systems, and more particularly to adaptive suspension support systems.

BACKGROUND

Since the advent of the wheel, mobility has permeated most aspects of life. From the animal drawn buggies and carts of yesteryear, to today's most sophisticated transportation vehicles, literally hundreds of millions of people have come to depend on mobility in their everyday lives. Mobility, for example, provides faster, more efficient modes of operation, thus creating more productive work related activities and more enjoyable recreational activities.

While the wheel remains as one of the most widely used mechanisms to facilitate today's transportation means, other transportation facilitation mechanisms, such as aerodynamic lift and jet propulsion, have also emerged. Generally speaking, all modes of transportation are derived from a need to transport payload from one point to another. The payload to be transported may represent animate objects, such as human beings, or inanimate objects, such as electronic equipment, volatile/explosive materials, etc.

In most instances, therefore, it is advantageous to reduce the amount of kinetic energy that is transferred to the payload, no matter what the payload may be. Substantial elimination of the transfer of road vibration to passengers in a motor vehicle, for example, may serve to minimize discomfort, such as back pain, that may be caused by the road vibration. Furthermore, such a reduction may also serve to increase the passengers' endurance during long road trips, while preserving energy once the destination has been reached.

Transportation of electronic components also presents challenges, since in many instances, the electronic components are required to be operational during transportation. As such, degraded performance, including complete malfunction, may be the unintended consequence of operating electronic components in the mobile environment, since due to the kinetic energy transfer, the electronic components may be subject to a reduced operational life.

Reduction in the amount of kinetic energy that is transferred to the vibration sensitive payloads during transport remains as a high priority design criteria for virtually every mode of transportation. Current kinetic energy absorption solutions, however, tend to be largely ineffective, due in part to the inadequate level of shock absorption provided. Other kinetic energy absorption solutions may only offer a static level of kinetic energy absorption and are, therefore, incapable of adapting shock absorption to a changing environment.

In a mobile environment, however, a substantial portion of the acceleration forces exerted on the payload are time varying acceleration forces, which renders the static kinetic energy absorption solutions largely ineffective. Efforts continue, therefore, to enhance shock absorption performance for virtually any payload for virtually all types of mobile and non-mobile environments.

SUMMARY

To overcome limitations in the prior art, and to overcome other limitations that will become apparent upon reading and understanding the present specification, various embodiments of the present invention disclose an apparatus and method of providing an adaptive suspension support system. The adaptive suspension support system may be implemented in virtually any environment to substantially isolate a payload from kinetic energy transfer.

In accordance with one embodiment of the invention, an adaptive support system comprises a payload, a coarse suspension device that is coupled to the payload and is adapted to maintain a position of the payload within a first range of distance. The adaptive support system further comprises a fine suspension device that is coupled to the payload. The fine suspension device being adaptively programmed via a control signal to dampen movement of the payload within the first range of distance. The adaptive support system further comprises a weight information device that is adapted to provide weight information relating to the payload. A damper resistance of the fine suspension device is adjusted in response to the weight information.

In accordance with another embodiment of the invention, an equipment rack assembly comprises an enclosure that is coupled to a platform, an equipment rack that is coupled to the enclosure and the platform, and a shock absorption unit that is coupled to the enclosure and the equipment rack. The shock absorption unit includes a weight bearing device that is coupled to the equipment rack and is adapted to maintain a position of the equipment rack within a first range of distance in a first direction relative to the enclosure. The shock absorption unit further includes a dampening device that is coupled to the equipment rack. The dampening device being adaptively programmed via a control signal to dampen movement of the equipment rack within the first range of distance. The shock absorption unit further includes a weight information device that is adapted to provide weight information relating to the equipment rack. A damper resistance of the dampening device is adjusted in response to the weight information.

In accordance with another embodiment of the invention, an equipment stand comprises an outer frame that is coupled to a platform and a plurality of couplings movably attached to the outer frame. The plurality of couplings move along a length of the outer frame. The equipment stand further comprises a payload that is coupled to first and second couplings of the plurality of couplings. The equipment stand further comprises a shock absorption unit that is coupled to the first and second couplings. The shock absorption unit includes a weight bearing device that is coupled to the platform and is adapted to maintain a position of the payload within a first range of distance relative to the platform. The shock absorption unit further includes a dampening device that is coupled to the weight bearing device and is adaptively programmed via a control signal to dampen movement of the payload within the first range of distance. The shock absorption unit further includes a weight information device that is adapted to provide weight information relating to the payload. A damper resistance of the dampening device is adjusted in response to the weight information.

BRIEF DESCRIPTION OF THE DRAWINGS

Various aspects and advantages of the invention will become apparent upon review of the following detailed description and upon reference to the drawings in which.

DETAILED DESCRIPTION

Generally, the various embodiments of the present invention are applied to the protection of a payload in a mobile and/or non-mobile environment. In particular, protection from kinetic energy transfer may be provided to assorted payloads in varying embodiments, whereby adaptive, multi-axis suspension is implemented to protect the payload from potentially destructive acceleration forces.

The multi-axis suspension system generally provides various modes of adaptability. In a first mode of adaptability, the multi-axis suspension system provides weight adaptation, such that a dynamic weight opposition force is applied to maintain a position of the payload between first and second positions relative to an equilibrium position of the payload. Thus, regardless of the weight of the payload, the equilibrium position of the payload is nevertheless substantially maintained between first and second threshold positions.

In a second mode of adaptability, the multi-axis suspension system provides acceleration adaptation, whereby a multi-dimensional damper force may be dynamically adjusted in response to varying acceleration forces that may be imposed upon the payload. Adaptive components associated with the multi-axis suspension system may include one or more accelerometers to monitor the acceleration forces. The multi-axis suspension system may further include one or more processing modules that may be used to analyze the detected acceleration forces to determine the proper mode of reactionary control necessary to optimally dampen the detected acceleration forces.

In a first embodiment, for example, the multi-axis, adaptive suspension system may be implemented for use in an electronic equipment rack. In this instance, the multi-axis, adaptive suspension system is employed so that kinetic energy resulting from operations in a mobile environment may be substantially absorbed. Exemplary electronic equipment applications may include airborne applications, whereby kinetic energy transfers due to atmospheric turbulence may be substantially eliminated. Still other electronic equipment rack applications may include motor vehicle based applications, whereby kinetic energy transfers due to non-ideal road conditions may also be substantially eliminated.

In an alternate embodiment, the multi-axis, adaptive suspension system may be used for stand alone equipment that may not necessarily be mounted within an electronic equipment rack. Such stand alone equipment may be found, for example, in recreational vehicle (RV) applications, where common household appliances, such as video display units, satellite television (TV) systems, microwave ovens, etc., may be found.

Conventional mounting techniques for these components within an RV typically involve hard mounting, whereby the components' instantaneous position with respect to the RV's instantaneous position remains virtually constant. Unfortunately, hard mounting is not conducive to the minimization of kinetic energy transfer to these components. Rather, hard mounting may instead provide a fairly efficient means of transferring kinetic energy to the component. Use of the multi-axis, adaptive suspension system, therefore, may isolate the component from a substantial portion of the kinetic energy that may be transferred from a conventional hard mount.

In another embodiment, the adaptive suspension system may be used to isolate passengers in a moving vehicle from potentially harmful kinetic energy transfer during vehicular motion. In particular, seats occupied by each passenger may be equipped with the adaptive suspension system, such that kinetic energy that would otherwise be transferred to the passengers, may instead be adaptively absorbed/dampened. Thus, by effectively shock mounting the passenger seats using an adaptive suspension system, the passengers may be substantially protected from varying acceleration forces that may be transferred to them as a result of vehicle movement.

In each of the embodiments discussed above, a dual mode, dampened suspension system may be utilized. In the first mode of suspension, coarse suspension control is provided to effect a weight bearing support, whereby the magnitude of support that is provided adapts to the combined weight of the protected payload. For example, as electronic components are added to the electronic equipment rack as discussed above, the coarse suspension control adapts by increasing the amount of opposing force that is necessary to maintain the position of the electronic components within a coarse position range. Conversely, as electronic components are removed, the coarse suspension control adapts by decreasing the amount of opposing force that is necessary to maintain the position of the electronic components within the coarse position range.

In a second mode of suspension, fine suspension control is provided through a varying damper force, which opposes movement and seeks to maintain a position of the payload within a fine position range. In a first embodiment, the damper force may be adaptive, such that the magnitude of the damper force is set in response to a feedback control signal from, for example, a micro-electro mechanical system (MEMS) accelerometer measurement device. As such, the damper force may be adaptively increased in response to accelerometer feedback indicating increased acceleration. Conversely, the damper force may be adaptively decreased in response to accelerometer feedback indicating decreased acceleration.

In a second embodiment, accelerometer feedback adaptation may be augmented through the use of processing blocks that continuously monitor the accelerometer feedback signal. In such an instance, signal processing may be employed to analyze both the time domain and frequency domain components of the accelerometer feedback signal in order to more accurately characterize the nature of the acceleration forces in real time. In addition, accelerometer feedback adaptation may further utilize weight information relative to the payload to establish a nominal damper resistance that is proportional to the weight of the payload for optimized performance.

Figure 1:
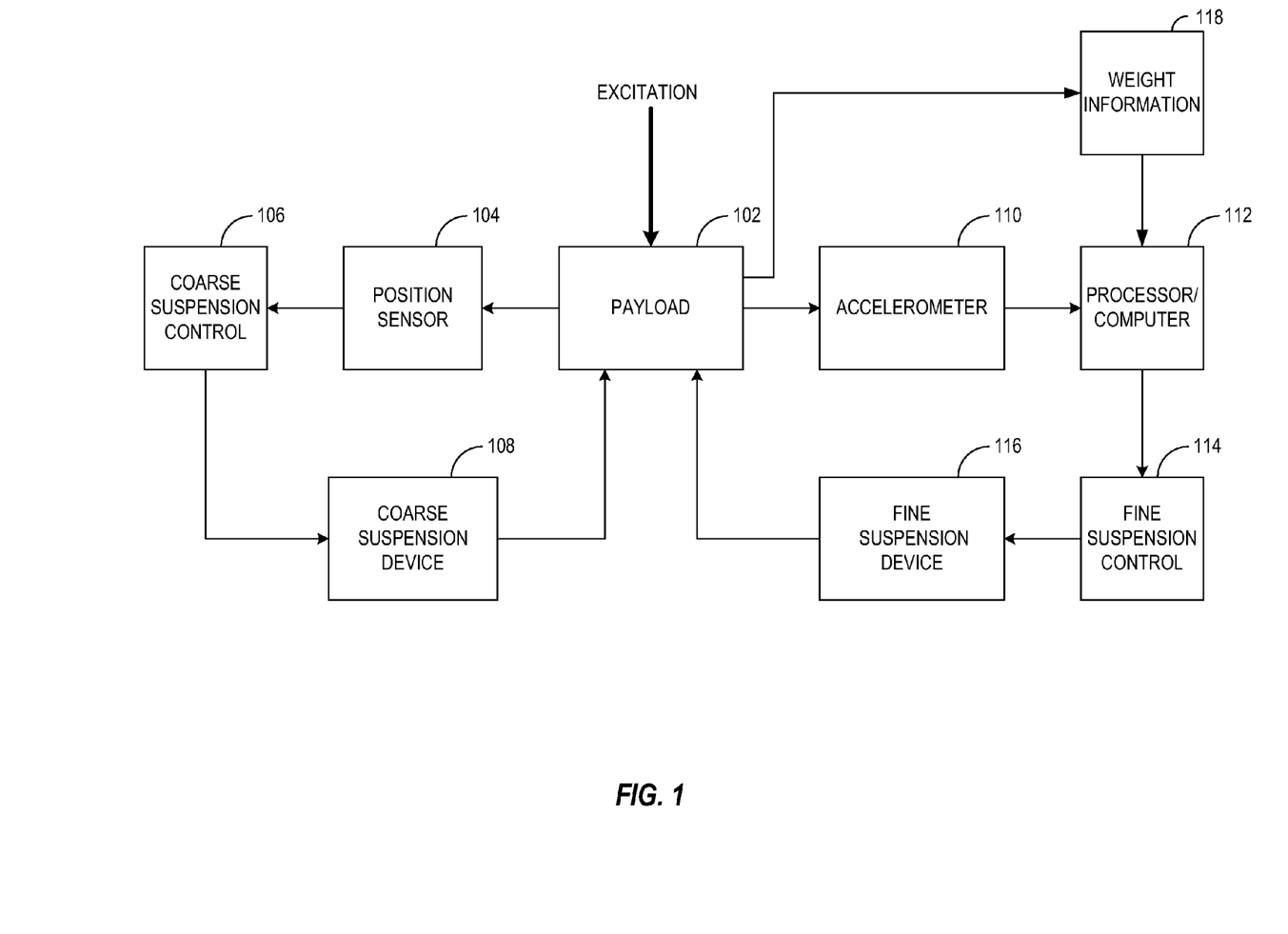
FIG. 1 illustrates an exemplary functional block diagram of an adaptive suspension system.

Turning to FIG. 1, an exemplary functional block diagram of an adaptive suspension system is illustrated. Payload 102 may be representative of animate, or inanimate, objects that may be subjected to varying acceleration forces, or excitations, as may be experienced in a mobile environment, such as in a motor vehicle or airplane. As discussed above, two modes of adaptive suspension are implemented to substantially eliminate kinetic energy transfer to payload 102.

In a first mode of adaptive suspension, coarse suspension control is effected to provide weight support to payload 102. In particular, a position of payload 102 may be detected by measuring the displacement of payload 102 along a directional axis, e.g., in a vertical direction. In a first embodiment, position sensor 104 may implement magnetic sensors that detect position excursions of payload 102 relative to an equilibrium position of payload 102.

In response to the detected position excursion, coarse suspension control 106 and coarse suspension device 108 may combine to return payload 102 to its equilibrium position. In a first embodiment, coarse suspension device 108 may include a coiled energy spring having a variable spring constant, k. In such an instance, payload 102 may exhibit a substantially fixed weight, whereby a substantially fixed amount of deflection below the equilibrium position of payload 102 is detected by position sensor 104. As such, coarse suspension control 106 may effect an increase in the spring constant, k, in response to the detected payload position, such that the position of payload 102 may return to its equilibrium position due to the increased spring constant.

In an alternative embodiment, coarse suspension device 108 may be implemented as a pneumatically controlled device, such as an air bladder or a pneumatically controlled lift. Accordingly, coarse suspension control 106 may be implemented as an air compressor, which may either inflate or deflate coarse suspension device 108 in response to a position control feedback signal emitted by position sensor 104. In such an instance, weight adaptation may be implemented to maintain payload 102 within a substantially fixed position range, irrespective of the weight of payload 102.

In response to an excursion of payload 102 below its equilibrium position, for example, coarse suspension control 106 may cause an inflation of coarse suspension device 108. By virtue of the mechanical coupling between payload 102 and coarse suspension device 108, the position of payload 102 may then be raised. In response to an excursion of payload 102 above its equilibrium position, on the other hand, coarse suspension control 106 may cause a deflation of coarse suspension device 108. By virtue of the mechanical coupling between payload 102 and coarse suspension device 108, the position of payload 102 may then be lowered.

In a second mode of adaptive suspension, fine suspension control is effected to dampen kinetic energy transfer to payload 102. Accelerometer 110 may be implemented to detect, and subsequently provide, an acceleration feedback control signal that is indicative of the time-varying attributes of acceleration excitations being applied to payload 102. Processor/computer 112 may then continually analyze the acceleration feedback control signal to determine the nature of the acceleration forces being applied.

For example, processor/computer 112 may apply a fast Fourier transform (FFT) to the acceleration feedback control signal to determine the spectral content of vibration that is generated by the acceleration excitations. As such, fine suspension control 114 and fine suspension device 116 may be adapted through the FFT analysis of processor/computer 112 to provide wide vibration bandwidth isolation to payload 102.

Harmonic components of vibration may also be analyzed to determine the time varying characteristics of the vibration. In particular, the power spectra of the vibration may be analyzed using the FFT algorithm to determine signal strength in designated frequency bands, i.e., FFT bins, of the FFT output. A quantitative relationship between the vibration amplitude in the time domain and the associated spectral amplitude in the frequency domain may then be obtained to optimize the kinetic energy absorption performance of fine suspension device 116.

For example, if the power spectra of the vibration is confined to relatively few FFT bins, then the acceleration excitation may be characterized as a steady state excitation having a sinusoidal property centered about a substantially constant frequency. As such, fine suspension device 116 may be optimized to dampen vibration at the steady state excitation frequency by appropriate control of its damper force via fine suspension control 114.

If the power spectra of the vibration is not confined to a relatively few FFT bins, but is rather spread out across multiple FFT bins, then the acceleration excitation may instead be characterized as a step change in payload 102 displacement, such as may be caused by driving over a pothole or speed bump. In such an instance, the damper force of fine suspension device 116 may be increased by fine suspension control 114 for optimum damper force at fundamental and harmonic frequencies of vibration excitation. Once the vibration impulse is dampened, fine suspension control 114 may return fine suspension device 116 to a steady state mode of operation as discussed above.

In addition, processor/computer 112 may continuously process FFT data to achieve a quiescent mode of operation, whereby optimized kinetic energy absorption across a wide bandwidth of vibration excitation may be further facilitated. That is to say, for example, that averaging of the FFT data may yield an optimized suspension control signal from fine suspension control 114, such that the damper force of fine suspension device 116 may be maintained at a nominal level between the steady state response and the step change response as discussed above.

Optimized suspension control in this context means that the reaction time of fine suspension device 116 is minimized due to the quiescent mode of operation. In particular, since fine suspension device 116 is programmed to exhibit a nominal damper force, the reaction time to achieve minimum or maximum damper resistance is essentially cut in half, assuming that the nominal damper force selected represents an average damper force across the entire dynamic range of damper force of fine suspension device 116.

In addition, weight information 118 that is received by processor/computer 112 from a manually programmed signal indicative of the weight of payload 102, and/or from some other weight sensing device, may also be used to program the nominal damper resistance. In particular, performance of fine suspension device 116 may be optimized by selecting a nominal damper resistance that is proportional to the weight of payload 102 as indicated by weight information 118.

In one embodiment, fine suspension device 116 may be implemented as a magnetorheological (MR) device, which incorporates MR fluid whose viscosity may be changed in the presence of a magnetic field. As such, a viscosity change in the MR fluid is effected by the presence of a magnetic field to increase/decrease the damper force of fine suspension device 116.

In particular, fine suspension control 114 may transmit a pulse width modulated (PWM) signal to a magnetic coil (not shown) that surrounds the MR fluid contained within a monotube housing of the MR device. The PWM signal parameters, such as duty cycle, may be modified in response to the analysis performed by processor/computer 112 to adjust the damper force of fine suspension device 116. Thus, fine suspension control is said to be adaptive, since the control signal parameters to the MR device are modified in response to the analysis performed by processor/computer 112.

Adaptive fine suspension control in this context is distinguished from static suspension control as may be provided, for example, by a rheostat. Rheostats, for example, often employ a control knob, which allows parameters of the control signal that is provided to the MR device to be statically programmed in response to the knob position. After that, the parameters of the control signal remain static, i.e. do not change, regardless of the analysis performed by an accelerometer and/or a processor/computing block.

Thus, static control in this context is only responsive to the control knob setting of the rheostat. It can be seen, therefore, that the adaptive fine suspension control of FIG. 1 improves upon statically controlled fine suspension systems in a mobile environment, since acceleration forces may be time varying, thus potentially requiring a dynamically controlled damper resistance. Weight information 118 may, however, be set via a rheostat to enhance the performance of fine suspension device 116 as discussed above. In particular, the weight of payload 102 may be reflected via the weight information signal emitted by the rheostat, whereby the weight information signal emitted by the rheostat is proportional to the weight of payload 102.

By increasing the duty cycle of the PWM signal in response to an adaptive control signal, fine suspension control 114 imparts an increased magnitude of time varying current to the magnetic coil, which in turn imparts an increased magnetic field around the MR fluid. In response, the damper forces exerted by fine suspension device 116 increases proportionally to react to dynamically changing acceleration forces. Conversely, by decreasing the duty cycle of the PWM signal in response to the adaptive control signal, fine suspension control 114 imparts a decreased magnitude of time varying current to the magnetic coil, which in turn imparts a decreased magnetic field around the MR fluid. In response, the damper forces exerted by fine suspension device 116 decreases proportionally in response to the adaptive control signal.

If weight information 118 is utilized by processor/computer 112, then fine suspension control 114 may command fine suspension device 116 to a nominal damper resistance that is proportional to the weight of payload 102 as indicated by weight information 118. In particular, fine suspension control 114 may set the duty cycle of the PWM signal, at least in partial response to the weight information, to impart a magnitude of time varying current to the magnetic coil that is proportional to at least the weight of payload 102. As such, the nominal damper resistance of fine suspension device 116 may be set at least in partial response to the weight of payload 102.

Figure 2:
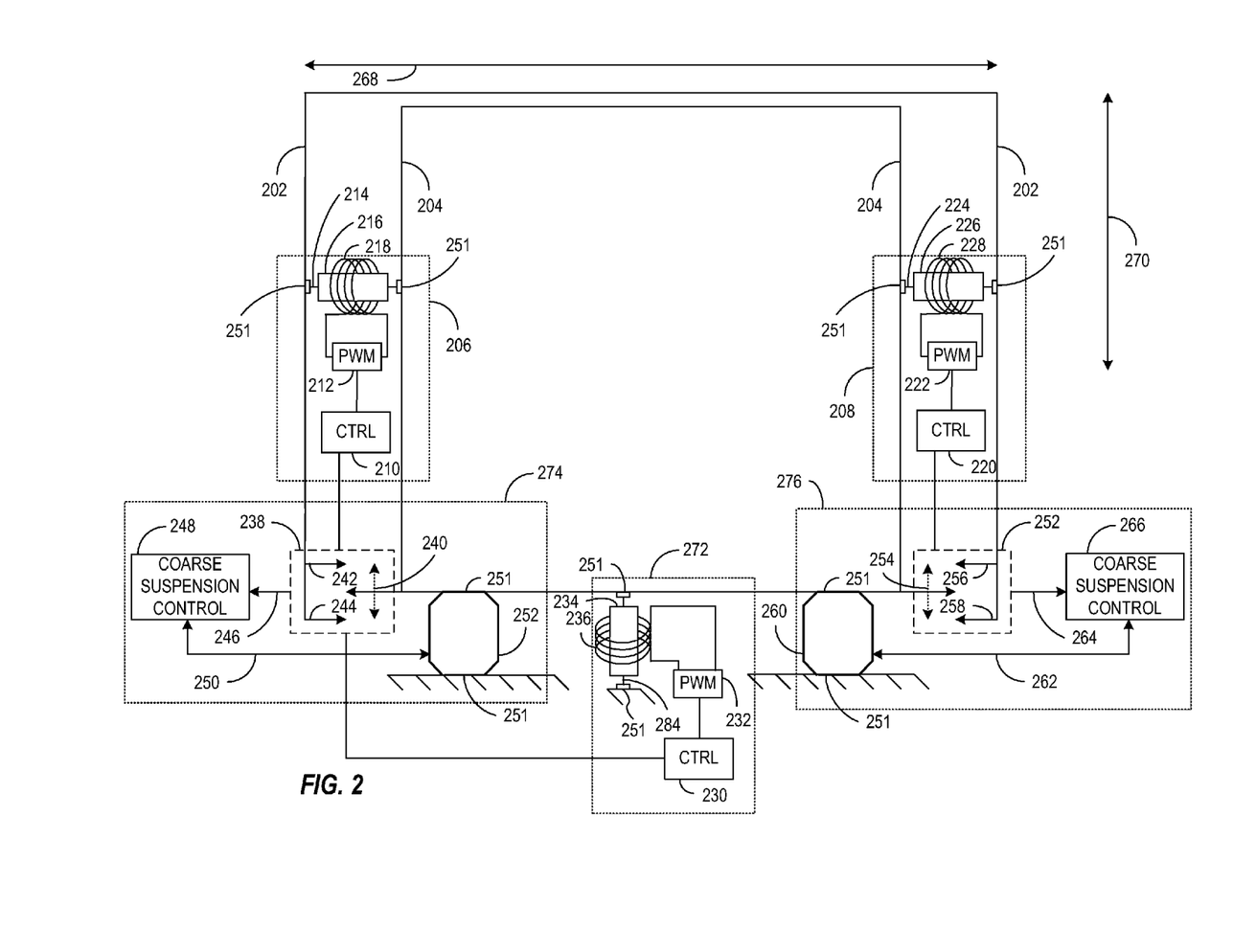
FIG. 2 illustrates an exemplary schematic diagram of a multi-axis, adaptive suspension system.

Turning to FIG. 2, an exemplary functional schematic diagram of one embodiment of a multi-axis, adaptive suspension system is illustrated. Coarse suspension control is provided via blocks 274 and 276 along a first axis denoted by directional vector 270. Fine suspension control is also provided via block 272 along the first axis. An additional component of fine suspension control may be provided via blocks 206 and 208 along a second axis as denoted by directional vector 268. Such may be the case, for example, whereby payload 204 represents an electronic component rack assembly contained within enclosure 202. Enclosure 202 may represent, for example, an outer assembly that provides structural support to the electronic component rack assembly.

In a first embodiment, coarse suspension devices 252 and 260 may include a coiled energy spring having a variable spring constant, k, as discussed above in relation to FIG. 1. In such an instance, payload 204 may exhibit a substantially fixed weight, whereby a substantially fixed amount of deflection below the equilibrium position of payload 204 is detected by position sensors 238 and 252. As such, coarse suspension controls 248 and 266 may effect an increase in the spring constant, k, in response to the detected payload position, such that the position of payload 204 may return to its equilibrium position due to the increased spring constant.

In a second embodiment, coarse suspension control is provided by pneumatic support components 252 and 260, which are mechanically coupled between a support platform and the bottom portion of payload 204. Position detectors 238 and 252 utilize, for example, magnetic sensors 242, 244 and 256, 258 to maintain payload 204 within a range of movement illustrated by vertical directional vectors 240 and 254. In particular, position signals 246 and 264 provide an indication to coarse suspension controls 248 and 266 as to the position of payload 204 relative to support enclosure 202. If the position of payload 204 is centered between sensors 242 and 244, for example, then pneumatic support 252 is considered to be in an equilibrium position and no further action is taken. Similarly, if the position of payload 204 is centered between sensors 256 and 258, for example, then pneumatic support 260 is considered to be in an equilibrium position and no further action is taken.

If, however, the position of payload 204 indicates a position 240 that is below equilibrium, then position signal 246 provides the requisite indication to coarse suspension control 248 to correct the over-weight condition. In particular, position signal 246 causes pneumatic support 252 to inflate, i.e., increase pressure, via line 250 until pneumatic support 252 is inflated to the equilibrium position. Similarly, if the position of payload 204 indicates a position 254 that is below equilibrium, then position signal 264 provides the requisite indication to coarse suspension control 266 to correct the over-weight condition. In particular, position signal 264 causes pneumatic support 260 to inflate, i.e., increase pressure, via line 262 until pneumatic support 260 is inflated to the equilibrium position.

If, on the other hand, the position of payload 204 indicates a position 240 that is above equilibrium, then position signal 246 provides the requisite indication to coarse suspension control 248 to correct the under-weight condition. In particular, position signal 246 causes pneumatic support 252 to deflate, i.e., decrease pressure, via line 250 until pneumatic support 252 is deflated to the equilibrium position. Similarly, if the position of payload 204 indicates a position 254 that is above equilibrium, then position signal 264 provides the requisite indication to coarse suspension control 266 to correct the under-weight condition. In particular, position signal 264 causes pneumatic support 260 to deflate, i.e., decrease pressure, via line 262 until pneumatic support 260 is deflated to an equilibrium position.

It should be noted, that pneumatic supports 252 and 260 may operate independently of one another. That is to say, for example, that the extent of inflation/deflation of pneumatic supports 252 and 260 may be unequal, so that unequal weight distribution of payload 204 along longitudinal axis 268 may nevertheless be equalized. Thus, irregardless of the weight distribution, the position of payload 204 may be substantially leveled with respect to support enclosure 202 to implement coarse suspension control. Alternately, the extent of inflation/deflation of pneumatic supports 252 and 260 may be made to be unequal to effect angled positioning of payload 204, with respect to directional vectors 268 and 270, as may be required for a given application.

Acting in conjunction with pneumatic supports 252 and 260 is fine suspension control block 272, which provides fine suspension along directional vectors 240 and 254. Optionally, fine suspension control blocks 206 and 208, may also provide fine suspension along directional vector 268. In operation, piston 284 extends and retracts through its stroke of motion, while being subjected to a variable damper force. In particular, monotube housing 234 is filled with an MR fluid and is surrounded by magnetic coil 236. The magnetic field created by magnetic coil 236 causes a viscosity change in the MR fluid to exert a programmable range of damper force on piston 284, where the viscosity changes in the MR fluid are effected by applying a variable magnitude of AC current to magnetic coil 236.

In operation, PWM 232 may receive a dynamic control signal from CTRL block 230, whereby CTRL block 230 may be implemented via blocks 110 and 112, as discussed above in relation to FIG. 1. If low damper force is required, for example, then the appropriate control signal from CTRL block 230 causes a relatively low duty cycle, PWM signal to be emitted from fine suspension control 114, e.g., PWM 232. In response, a relatively low magnitude of AC current is imparted to magnetic coil 236, which in turn imparts a relatively low magnitude magnetic field around monotube housing 234. Accordingly, the MR fluid contained within monotube housing 234 reactively assumes a relatively low viscosity, which in turn provides a relatively low damper force to oppose the movement of piston 284.

If a relatively greater damper force is required, on the other hand, then the appropriate control signal from CTRL block 230 causes PWM 232 to transmit a relatively high duty cycle, PWM signal to be emitted from fine suspension control 114, e.g., PWM 232. In response, a relatively high magnitude of AC current is imparted to magnetic coil 236, which in turn imparts a relatively high magnitude magnetic field around monotube housing 234. Accordingly, the MR fluid contained within monotube housing 234 reactively assumes a relatively high viscosity, which in turn provides a relatively high damper force opposing the movement of piston 284.

In operation, accelerometer 110 of CTRL block 230 measures acceleration forces along directional vectors 240 and 254 and provides a time domain signal that is indicative of the acceleration excitations detected. Processor/computer 112 may then perform digital signal processing on the time domain signal to determine the appropriate reactionary damper resistance that may be needed to appropriately dampen the acceleration excitations across a wide vibration bandwidth.

A low magnitude of instantaneous acceleration force, for example, may result in an adaptively programmed low duty cycle PWM signal for a low amount of damper force, whereas a high magnitude of instantaneous acceleration force may result in an adaptively programmed high duty cycle PWM signal for a high amount of damper force. A nominal amount of damper force may also be implemented by establishing a quiescent PWM signal, in response to an average of acceleration forces exerted over a given time period, to decrease the reaction time to changing acceleration forces. Thus, acceleration forces across a wide vibration bandwidth may be adaptively dampened through the adaptive feedback provided by accelerometer 110, processor/computer 112, and fine suspension control 114.

Weight information received by control blocks 210, 220, 230 from sensors 238, 252, or from some other weight sensing device, may also be used to program the nominal damper resistance. In particular, performance of the fine suspension devices may be optimized by selecting a nominal damper resistance that is proportional to the weight of payload 204.

If the weight of payload 204 is relatively low, for example, then the appropriate control signals from CTRL blocks 210, 220, 230 causes a relatively low duty cycle, PWM signal to be emitted from PWMs 212, 222, 232. In response, a relatively low magnitude of AC current is imparted to the respective magnetic coils, which in turn imparts a relatively low magnitude magnetic field around the respective monotube housings. Accordingly, the MR fluid contained within each monotube housing reactively assumes a relatively low viscosity, which in turn provides a relatively low damper force that is proportionate to the relative low weight of payload 204.

If the weight of payload 204 is relatively high, on the other hand, then the appropriate control signals from CTRL blocks 210, 220, 230 causes a relatively high duty cycle, PWM signal to be emitted from PWMs 212, 222, 232. In response, a relatively high magnitude of AC current is imparted to the respective magnetic coils, which in turn imparts a relatively high magnitude magnetic field around the respective monotube housings. Accordingly, the MR fluid contained within each monotube housing reactively assumes a relatively high viscosity, which in turn provides a relatively high damper force that is proportionate to the relative high weight of payload 204.

In an optional embodiment, MR suspension blocks 206 and 208 may also be used to isolate kinetic energy from being transferred to payload 204 along a longitudinal axis depicted by directional vector 268. Operation of MR suspension blocks 206 and 208 operate substantially as discussed above in relation to MR suspension block 272. A third component of MR suspension may also be provided for payload 204, whereby the third component is provided along a directional vector that is orthogonal to directional vectors 268 and 270.

A layer of elastomeric material 251 may also be used between suspension blocks 206-208, 272-276 and their respective mounting surfaces to provide additional vibration/shock absorption. Furthermore, elastomeric compounds having varying resonant frequencies may be selected to optimize the operation of the suspension system. For example, given that the MR dampers are responsive up to a nominal frequency of, e.g., 40 hertz, the resonant frequency of the elastomeric material may be individually selected to be higher than the operational frequency range of the MR dampers. Thus, by appropriate staggering of resonant frequencies, each individual elastomeric mount 251 may be selected to extend the operational bandwidth of the suspension system to well beyond the operational frequency range of the MR dampers.

Figure 3:
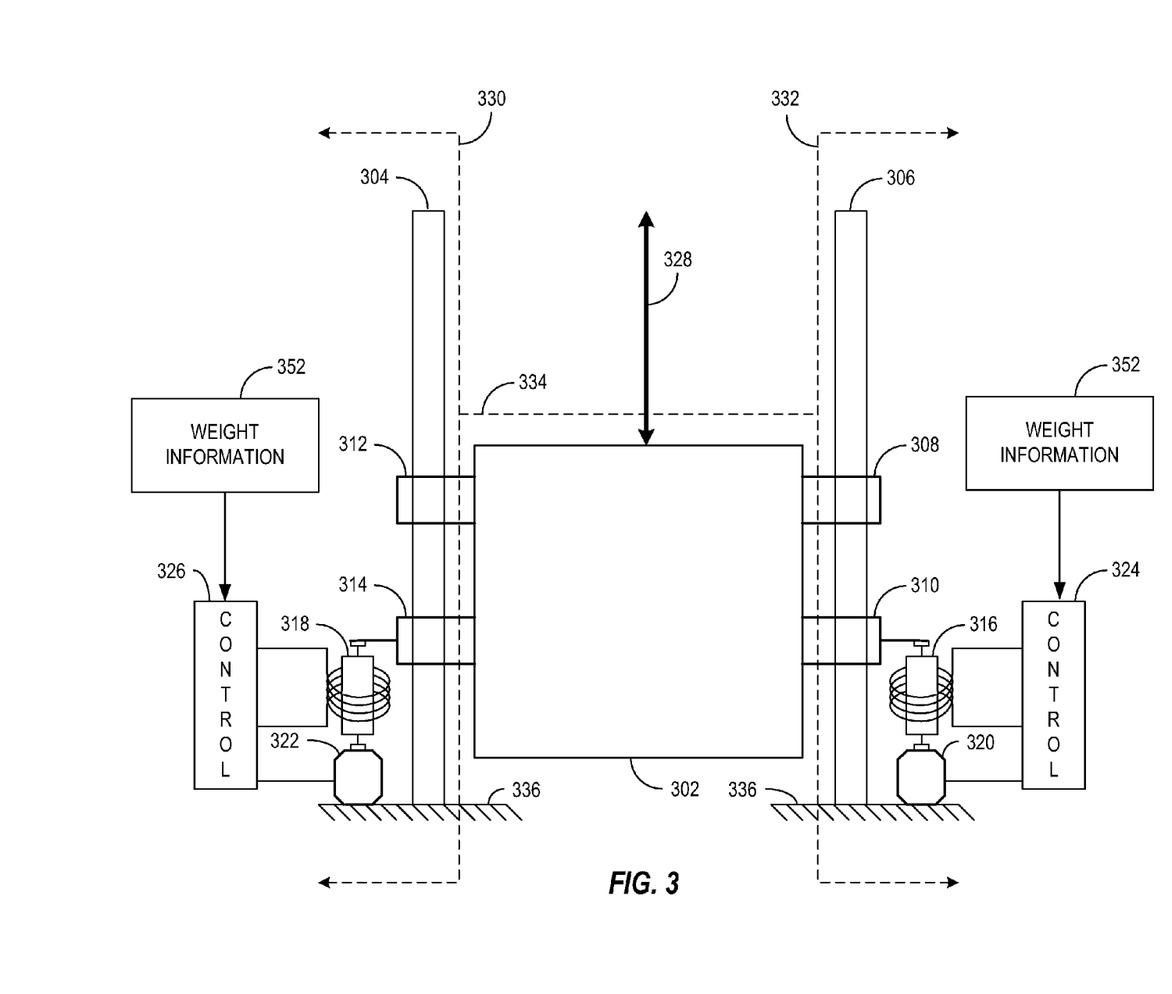
FIG. 3 illustrates an alternative embodiment of an adaptive suspension system.

Turning to FIG. 3, an alternate embodiment of an adaptive suspension system is applied to a component support stand. As discussed above, the adaptive suspension system may be used for stand alone equipment that may not necessarily be mounted within an electronic equipment rack. Such stand alone equipment may be found, for example, in recreational vehicle (RV) applications, where common household appliances, such as video display units, satellite television (TV) systems, microwave ovens, etc., may be found.

Payload 302 may exemplify such a stand alone appliance, whereby in one embodiment, adaptive suspension may be provided to payload 302, even though payload 302 may take on a plurality of positions along directional vector 328. In a first embodiment, for example, payload 302 may represent a video display device, whereby in one mode of operation, video display device 302 remains in a completely stowed position below panel 334 to remain hidden from plain view. All support structures and control elements to the left of panel 330 and to the right of panel 332 may similarly be hidden from view by appropriate placement of panels 330 and 332.

In such an instance, the position of a top portion of video display device 302 may be below panel 334 to hide the existence of video display device 302 when video display device 302 is in the stowed position as illustrated. Video display device 302 may also be raised along directional vector 328, whereby panel 334 is caused to pivot about its mounting hinges (not shown) to allow video display device 302 to emerge into a fully extended position. In its fully extended position, for example, the bottom portion of video display device 302 rises above panel 334 so that video display device 302 becomes visible and may then be utilized in its intended capacity, such as for the presentation of audio/visual entertainment.

The vertical position of payload 302 may be adjusted through actuation of coarse suspension control devices 320 and 322, which as discussed above, may be implemented as pneumatically controlled devices. Control blocks 324 and 326 may include compressors and position sensors, such that the commanded position of payload 302 may be maintained through appropriate actuation of pneumatically controlled devices 320 and 322.

Acting in conjunction with pneumatically controlled devices 320 and 322 are fine suspension control devices 316 and 318, which in one embodiment, may be implemented as MR suspension devices, to provide fine suspension along directional vector 328. Since MR suspension devices 316 and 318 maintain mechanical coupling with payload 302 throughout the entire extension range of payload 302, the operation of MR suspension devices 316 and 318 are unaffected by the vertical position of payload 302. That is to say, for example, that MR suspension devices 316 and 318 substantially eliminate kinetic energy transfer to payload 302, irregardless of the vertical position of payload 302.

Control blocks 324 and 326, for example, may combine accelerometer 110, processor/computer block 112, and fine suspension control 114 as discussed above in relation to FIG. 1, to adaptively dampen kinetic energy transfer to payload 302. Accelerometer 110 may be implemented to detect, and subsequently provide, an acceleration feedback control signal that is indicative of the time-varying attributes of acceleration excitations being applied to payload 302.

Processor/computer 112 may then continually analyze the acceleration feedback control signal to determine the nature of the acceleration forces being applied. Control blocks 324 and 326 may then provide an appropriate control signal to MR suspension devices 316 and 318, respectively, in response to the analysis performed by processor/computer 112. Control blocks 324 and 326 may similarly provide an appropriate control signal to MR suspension devices 316 and 318, respectively, to maintain a nominal magnitude of MR damper resistance that is in proportion to the weight of payload 302 as provided by weight information 352. As discussed above, weight information 352 may be provided manually by a rheostat, or automatically by a weight sensing device.

Payload 302 may be mechanically supported by a plurality of movable couplings 308-314 having linear bearings, such that payload 302 "floats" above platform 336 in both the fully extended, and fully retracted, position. The linear bearings of movable couplings 308-314 track vertically along outer frame 304 and 306 to maintain payload 302 in a laterally fixed relationship with respect to outer frame 304 and 306. The laterally fixed relationship being maintained both during movement of payload 302 along directional vector 328 and during its fully extended and fully retracted position.

Adjusting the vertical position of payload 302 requires that pneumatically controlled devices 320 and 322 be adjusted, in response to the desired position of payload 302. Accordingly, inflating pneumatically controlled devices 320 and 322 causes payload 302 to track upward along directional vector 328, whereby the lateral relationship with respect to outer frame 304 and 306 is maintained by movable couplings 308-314. Conversely, deflating pneumatically controlled devices 320 and 322 causes payload 302 to track downward along directional vector 328, whereby the lateral relationship with respect to outer frame 304 and 306 is maintained by movable couplings 308-314.

Figure 4:
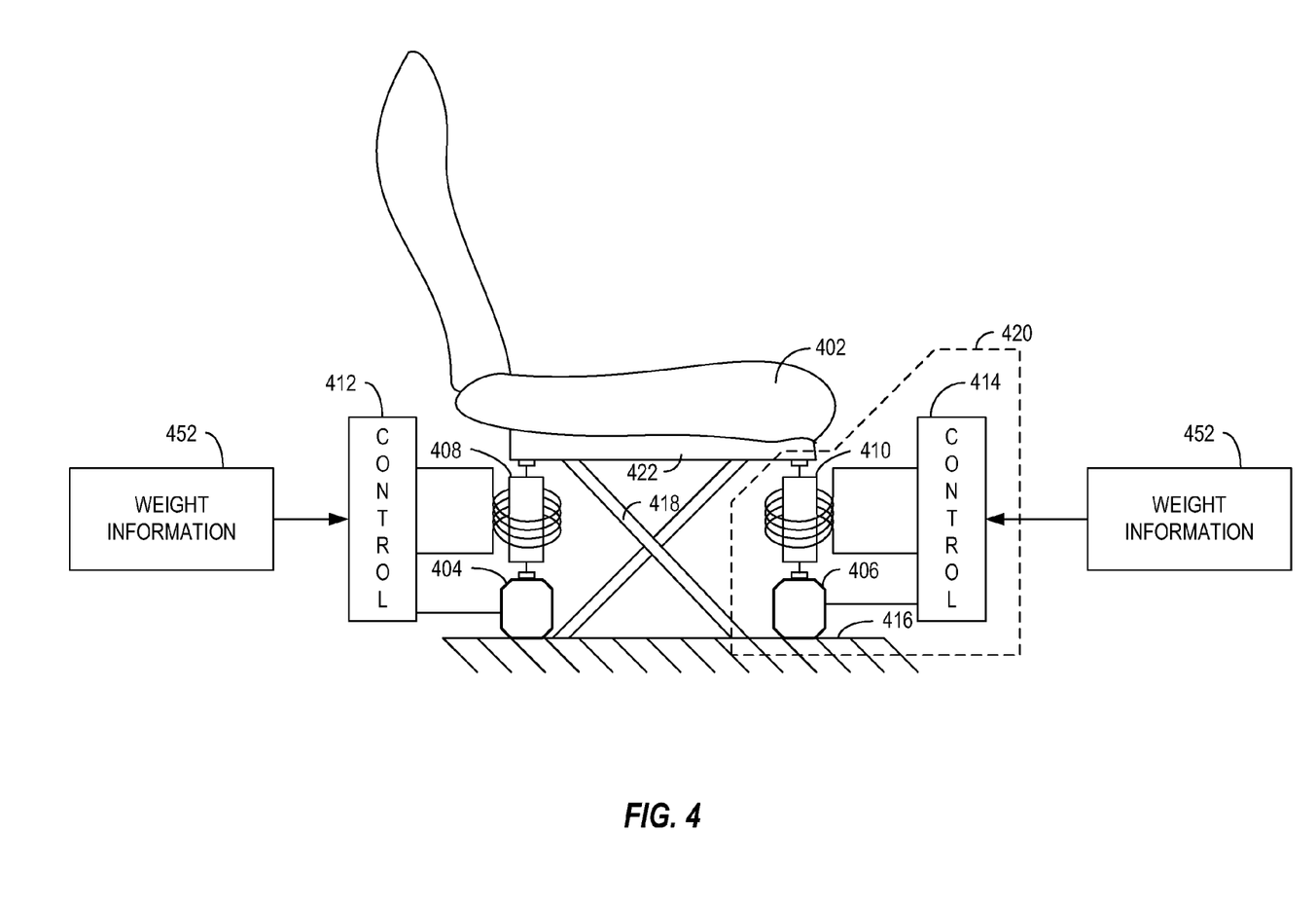
FIG. 4 illustrates an alternative embodiment of an adaptive suspension system.

Turning to FIG. 4, an alternate embodiment of an adaptive suspension system is exemplified, in which the payload may represent passenger seat 402, as well as the passenger (not shown), within a motor vehicle or airborne transport mechanism. As illustrated, an optional adaptive suspension system 420 may be combined with other suspension systems, such as support structure 418, for added programmability of the commanded position of seat 402, as discussed in more detail below. It should be noted, that suspension devices 404-410 may be installed vertically as illustrated, or conversely, may be angled as necessary to facilitate a given implementation. Furthermore, any placement of suspension devices 404-410 along seat frame 422 and platform 416 may be implemented as required to facilitate a given implementation.

The vertical position of the payload may be adjusted through actuation of coarse suspension control devices 404 and 406, which in a first embodiment, may be implemented using coiled energy springs having either fixed, or variable, spring constants, k, and in a second embodiment, may be implemented using pneumatically controlled devices. Control blocks 412 and 414 may include compressors and position sensors, such that the commanded position of the payload may be maintained through appropriate actuation of pneumatically controlled devices 404 and 406 irregardless of the weight of passenger seat 402 and passenger (not shown).

The commanded position of passenger seat 402 may be substantially horizontal to platform 416 by maintaining coarse suspension control devices 404 and 406 at substantially the same inflation level. Alternately, a slightly reclined position may be maintained, without sacrifice to kinetic energy absorption capability, by inflating coarse suspension control device 406 to a slightly higher level as compared to coarse suspension control device 404. It can be seen that a multitude of adjustment configurations may be enhanced via optional adaptive suspension system 420 without the loss of kinetic energy absorption capability.

Acting in conjunction with pneumatically controlled devices 404 and 406 are fine suspension control devices 408 and 410, which in one embodiment, may be implemented as MR suspension devices. Since MR suspension devices 408 and 410 maintain mechanical coupling with passenger seat 402 throughout the entire adjustment range of passenger seat 402, the operation of MR suspension devices 408 and 410 are unaffected by the adjustment of passenger seat 402. That is to say, for example, that MR suspension devices 408 and 410 substantially eliminate kinetic energy transfer to passenger seat 402 (and associated passenger), irregardless of the configured position of passenger seat 402.

Control blocks 412 and 414, for example, may combine accelerometer 110, processor/computer block 112, and fine suspension control 114, as discussed above in relation to FIG. 1, to adaptively dampen kinetic energy transfer to passenger seat 402. Accelerometer 110 may be implemented to detect, and subsequently provide, an acceleration feedback control signal that is indicative of the time-varying attributes of acceleration excitations being applied to passenger seat 402.

Processor/computer 112 may then continually analyze the acceleration feedback control signal to determine the nature of the acceleration forces being applied. Control blocks 412 and 414 may then provide an appropriate control signal to MR suspension devices 408 and 410, respectively, in response to the analysis performed by processor/computer 112. Control blocks 412 and 414 may similarly provide an appropriate control signal to MR suspension devices 408 and 410, respectively, to maintain a nominal magnitude of MR damper resistance that is in proportion to the weight of passenger seat 402 (and associated passenger) as provided by weight information 452. As discussed above, weight information 452 may be provided by a manually programmed rheostat, a weight sensing device, etc.

Other aspects and embodiments of the present invention will be apparent to those skilled in the art from consideration of the specification and practice of the invention disclosed herein. For example, the payload may not necessarily correspond to electronic components. Rather, the payload may instead correspond to other shock sensitive materials, such as nitroglycerin, which requires transportation mechanisms that minimize the amount of kinetic energy transferred, so as to minimize the possibility of premature detonation.

Furthermore, maritime, telecommunications, and seismic applications, may also benefit from the kinetic energy isolation systems presented herein. It is intended, therefore, that the specification and illustrated embodiments be considered as examples only, with a true scope and spirit of the invention being indicated by the following claims.

What is claimed is:

1. An adaptive support system, comprising:
    a payload;
    a position sensing device to sense a position of the payload;
    a coarse suspension device coupled to the payload, the coarse suspension device receiving a signal from the position sensing device to maintain a position of the payload within a first range of distance based on the signal, wherein the coarse suspension device includes one or more pneumatically controlled devices;
    a fine suspension device coupled to the payload, the fine suspension device being adaptively programmed via a control signal to dampen movement of the payload within the first range of distance; and
    a weight information device to provide weight information relating to the payload, wherein a damper resistance of the fine suspension device is adjusted in response to the weight information.

2. The adaptive support system of claim 1, wherein the payload includes a passenger seat of a vehicle.

3. The adaptive support system of claim 1, wherein the one or more pneumatically controlled devices have substantially equal inflation levels.

4. The adaptive support system of claim 1, wherein the one or more pneumatically controlled devices have substantially unequal inflation levels.

5. The adaptive support system of claim 1, wherein the damper resistance of the fine suspension device is adjusted in proportion to a weight of the payload.

6. The adaptive support system of claim 1, wherein the weight information device includes a rheostat.

7. The adaptive support system of claim 1, wherein the weight information device includes a weight sensing device.

8. The adaptive support system of claim 1, wherein the fine suspension device includes a magnetorheological device.

* * * * *